United States Patent
Connor et al.

(10) Patent No.: US 9,773,166 B1
(45) Date of Patent: Sep. 26, 2017

(54) IDENTIFYING LONGFORM ARTICLES

(71) Applicant: Google Inc., Mountain View, CA (US)

(72) Inventors: Miriam King Connor, Menlo Park, CA (US); Isabelle L. Stanton, Mountain View, CA (US); Amarnag Subramanya, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 56 days.

(21) Appl. No.: 14/931,576

(22) Filed: Nov. 3, 2015

Related U.S. Application Data (60) Provisional application No. 62/074,348, filed on Nov. 3, 2014.

(51) Int. Cl.
*G06K 9/00* (2006.01)
*G06K 9/66* (2006.01)

(52) U.S. Cl.
CPC .......... *G06K 9/00469* (2013.01); *G06K 9/66* (2013.01)

(58) Field of Classification Search
CPC ....... G06K 9/00442–9/00469; G06K 9/00483; G06K 9/2054–9/2081; G06K 9/3216; G06K 9/346; G06K 9/62–9/6262; G06K 9/6267–9/6281; G06K 9/66; G06K 2017/0038; G06K 2209/015; G06K 2209/50–2209/506; G06K 2207/20081; G06K 2207/30176; H04N 1/2166; H04N 21/25–21/251; H04N 21/466–21/4666; H04N 2201/3225; H04N 2201/3243; H04N 2201/3259; H04N 2201/3287–2201/329; G06F 17/2765–17/279; G06F 17/30705–17/30716; G06F 17/30722–17/30728; G06N 99/005; G09B 7/00; G09B 7/02
See application file for complete search history.

(56) References Cited

U.S. PATENT DOCUMENTS

| | | | |
|---|---|---|---|
| 4,933,979 A * | 6/1990 | Suzuki | G06K 9/00449 382/100 |
| 5,097,418 A * | 3/1992 | Nurse | G06F 17/241 715/207 |
| 7,499,591 B2 | 3/2009 | Simske et al. | |

(Continued)

OTHER PUBLICATIONS

U.S. Appl. No. 14/751,774, filed Jun. 26, 2015, Shukla et al.
(Continued)

*Primary Examiner* — Jose Couso
(74) *Attorney, Agent, or Firm* — Fish & Richardson P.C.

(57) ABSTRACT

Methods, systems, and apparatus, including computer programs encoded on computer storage media, for classifying documents. One of the methods includes obtaining a collection of training documents, the training documents including positive documents identified as being longform documents and negative documents identified as not being longform documents; extracting one or more features from the training documents, wherein the features represent lexical or textual content of the training documents; and generating a longform document classifier trained using feature instances extracted from the training documents, wherein the generated longform document classifier is trained such that input documents are classified as being longform documents or classified as not being longform documents.

19 Claims, 4 Drawing Sheets

(56) References Cited

U.S. PATENT DOCUMENTS

| | | | | |
|---|---|---|---|---|
| 8,082,248 | B2* | 12/2011 | Abouyounes | G06F 17/30265 |
| | | | | 707/731 |
| 8,352,386 | B2 | 1/2013 | Chitiveli et al. | |
| 2010/0185568 | A1 | 7/2010 | Bates et al. | |
| 2012/0310627 | A1 | 12/2012 | Qi et al. | |
| 2015/0310003 | A1* | 10/2015 | Brav | G06F 17/30011 |
| | | | | 707/800 |
| 2015/0310128 | A1* | 10/2015 | Brav | G06F 17/30011 |
| | | | | 707/800 |
| 2017/0039174 | A1* | 2/2017 | Strope | G06F 17/2264 |

OTHER PUBLICATIONS

Ashok et al., "Success with Style: Using Writing Style to Predict the Success of Novels," Proceedings of the 2013 Conference on Empirical Methods in Natural Language Processing, pp. 1753-1764, Oct. 2013.

Berger et al., "A Maximum Entropy Approach to Natural Language Processing," Association for Computational Linguistics, 1989, 36 pages.

Dean and Ghemawat, "MapReduce: Simplified Data Processing on Large Clusters," OSDI'04: Sixth Symposium on Operating System Design and Implementation, Dec. 2004, pp. 1-13.

Louis and Nenkova, "What Makes Writing Great? First Experiments on Article Quality Prediction in the Science Journalism Domain," Transactions of the Association for Computational Linguistics, 1 (2013), pp. 341-352.

Petrenz, "Cross-Lingual Genre Classification," Proceedings of the EACL 2012 Student Research Workshop, pp. 11-21.

* cited by examiner

IDENTIFYING LONGFORM ARTICLES

CROSS-REFERENCE TO RELATED APPLICATIONS

This application claims the benefit under 35 U.S.C. §119(e) of the filing date of U.S. Patent Application No. 62/074,348, for Identifying Longform Articles, which was filed on Nov. 3, 2014, and which is incorporated here by reference.

BACKGROUND

This specification relates to classifying documents.

The Internet provides access to a wide variety of resources, for example, documents, web pages, image files, video files, or audio files. A search system can identify resources responsive to queries submitted by users and provide information about the resources in a manner that is useful to the users. Responsive resources can be identified in part based on a classification of resources. The users can navigate through, e.g., select, search results to obtain information of interest.

SUMMARY

This specification describes technologies for classifying longform documents. These technologies generally involve generating a document classifier to determine whether or not a particular document is a longform document based on a number of features obtained from the content of the document. The generated classifier is trained based on one or more features extracted from the content of a collection of training documents. Classified longform documents can be identified as such in search results in response to appropriate search queries.

In general, one innovative aspect of the subject matter described in this specification can be embodied in methods that include the actions of obtaining a collection of training documents, the training documents including a group of positive documents and a group of negative documents, wherein the positive documents are training documents identified as being longform documents and the negative documents are training documents identified as not being longform documents; extracting a plurality of features from the training documents, wherein the plurality of features are associated with a plurality of different feature types that represent lexical or textual content of the training documents that are indicative of a document's writing style; and generating a longform document classifier trained using feature instances extracted from the training documents, wherein the generated longform document classifier is trained such that input documents are classified as being longform documents or classified as not being longform documents. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method further includes evaluating the generated longform document classifier using a group of sample documents having known classifications. The method further includes applying the longform document classifier to a corpus of documents; annotating an information retrieval index with an output classification for each document of the corpus of documents; and using the annotated index to provide search results identifying longform documents in response to a search query. The one or more features include a parse n-gram feature that indicates common sentence structures in the documents based on dependency parse trees. The one or more features include a parts of speech n gram feature that indicates aspects of common sentence structures in the documents. The one or more features include a linear parse n gram feature that extract parse tags for a sequence of tokens. The one or more features include a pronoun person frequency feature that identifies a relative frequency of first, second, and third person pronouns among all pronouns in a given document. The one or more features include a punctuation frequency that identifies a relative frequency of different punctuation types in a given document.

The subject matter described in this specification can be implemented in particular embodiments so as to realize one or more of the following advantages. Longform documents can be classified and made available in response to received queries. Classifying the longform documents using features extracted from document content improves the identification of longform documents. In some implementations, the classification of longform documents can be used to discard non-longform documents in response to a query. Additionally, the classifier can provide a classification score along a continuum that can be used by a search system when ranking search results.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Document classifiers assign particular documents to one or more classes or categories. Different types of documents may be classified including text, images, or audio. Machine learning can be used to train a classifier model designed to perform a particular classification. For example, a particular classifier can be used to determine whether or not a document belongs to a particular topic or includes a particular type of content. The output of the classifier can indicate whether an input document is or is not classified as belonging to the particular topic/includes the particular type of content.

Longform documents can be described in this specification as in-depth articles. In particular a longform document can describe an article that provides insightful perspective on one or more topics, and/or includes a well-researched article that provokes deeper thought in readers. For example, longform documents can be described as so-called "read-to-learn" articles. In some examples, a longform document can be described as an article that does not simply provide a detailed or comprehensive overview of a topic, or an article that reports a news event. For example, an article that is directed to providing encyclopedic information on a topic would not be considered a longform document. As another example, an article that is directed to reporting a news event would not be considered a longform document.

Using university admissions as an example topic, example longform documents can include "Race and College Admissions, Facing a New Test by Justices," authored by Adam Liptak, and published on www.nytimes.com on Oct. 8, 2012, "Getting In," authored by Malcolm Gladwell, and published on www.newyorker.com on Oct. 10, 2005, and "The Myth of American Meritocracy," authored by Ron Unz, and published on www.theamericanconservative.com on Nov. 28, 2012. These example articles, provide insightful perspective on university admissions, and provoke deeper thought in some readers. Example articles that would not be described as longform documents with respect to university admissions include web pages of one or more universities describing respective admissions processes, a web page published on an encyclopedic web site that generally describes university admissions processes, or a news report of a court ruling on university admissions.

Network resources associated with documents classified as longform documents can be used to provide search results, responsive to a search query, that specifically identify longform documents either alone or in addition to general search results. In particular, the longform documents can be identified in part upon their classification, which allows high quality longform content to be returned in response to a search query even if it is not necessarily new or popular, e.g., not highly ranked according to a scoring process for general search results.

Figure 1:
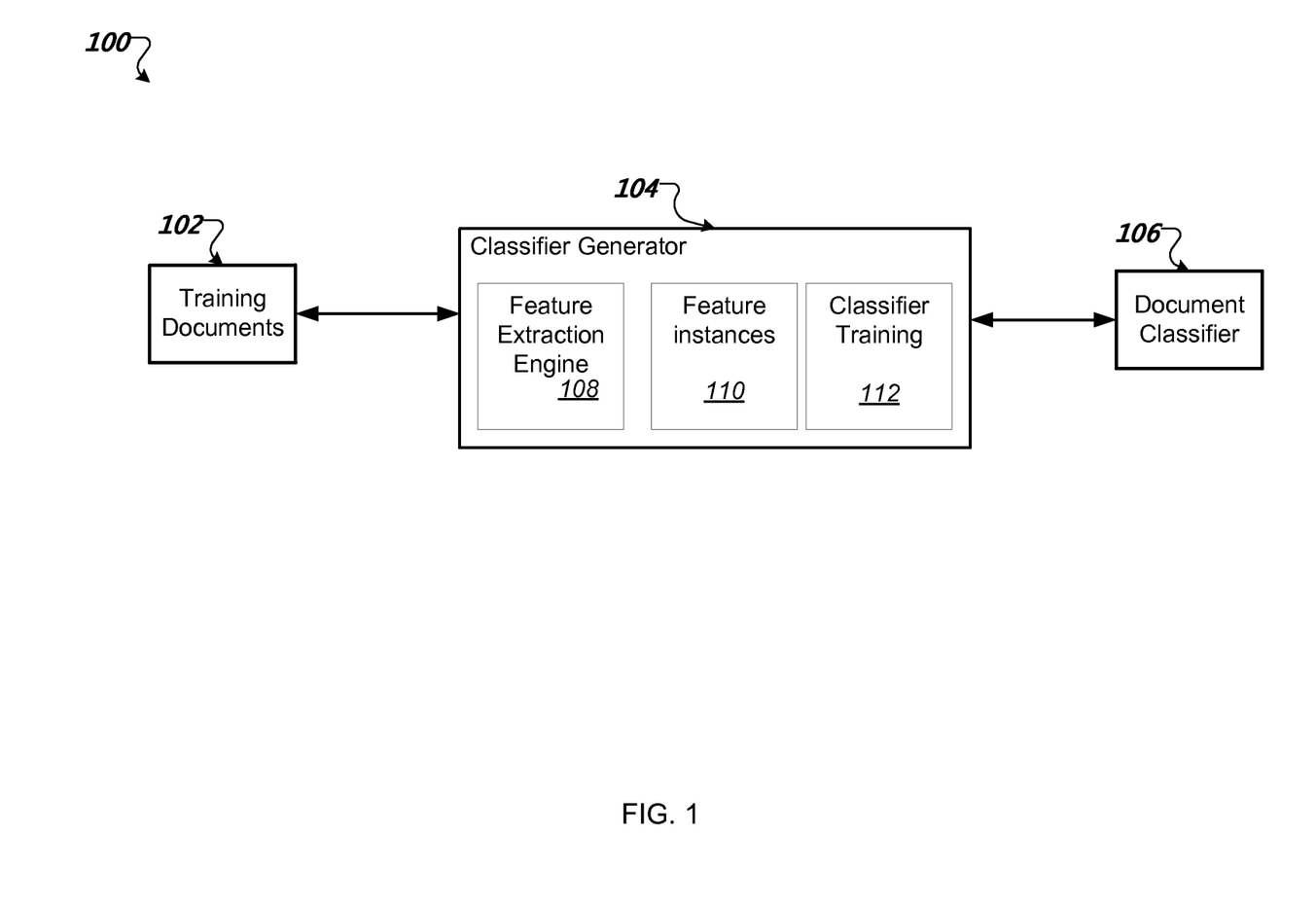
FIG. 1 shows an example system for training a longform document classifier.

FIG. 1 shows an example system 100 for training a longform document classifier. In particular, the longform document classifier distinguishes between longform and non-longform documents based on document features derived from the particular content and structure of the documents.

The system 100 includes a classifier generator 104 that receives a collection of training documents 102 and uses them to generate a longform document classifier 106. The collection of training documents include a group of positive documents identified as known longform documents and negative documents identified as not being longform documents. In some implementations, the collection of training documents are obtained as a set of references, e.g., uniform resource locator addresses, to the corresponding documents rather than the documents themselves.

The positive documents can be documents that have been manually identified as corresponding to longform documents, e.g., by one or more expert users. In some other implementations, an existing ranking system, e.g., by a search system, is used to accurately identify some longform documents. For example, highly ranked documents responsive to queries submitted to an in-depth article search on a search engine. Additionally, longform documents can be identified from a corpus of documents populated with documents from particular publishers known to produce longform articles or populated with documents corresponding to articles selected for particular writing awards.

The negative documents can be sampled from a corpus of documents, e.g., a web corpus. For example, documents in a news corpus can be sampled as unlikely to include longform documents though some small percentage may be included in the corpus. In some implementations, other sources of documents can also be sampled to identify negative documents including blogs, news webpages, or comment feeds.

In some implementations, the negative documents are sampled with the constraint that the documents have comparable length to the positive longform documents. This can help reduce any bias effect in the classifier based on document length. Additionally, the training documents 102 can be periodically refreshed and used to update the longform document classifier.

The classifier generator 104 includes a feature extraction engine 108, feature instances 110, and classifier training engine 112. The feature extraction engine 108 extracts lexical and textual features from the received training documents 102. A number of different types of features are extracted as indicative of a document's writing style. Extracted features can include n-grams, parse paths through the document, a frequency of pronouns and different pronoun persons among document mentions, and punctuation use. Specific features are described in greater detail below.

One or more suitable feature extraction techniques can be used to perform feature extraction. For example, the text of each document is tokenized to facilitate extraction of particular n-gram based features. In particular, any suitable natural language parser can be used. A natural language parser processes text based on the grammatical structure sentences. In some implementations, a dependency parser is used to construct grammatical trees representing syntactic structure for the sentences in the training documents. Alternatively a constituency parser could be used to extract similar features. An example natural language parser is the Stanford Parse described at http://nlp.stanford.edu/software/lex-parser.shtml.

In some implementations, feature hashing is performed to reduce the features space and to provide regularization. In particular, feature hashing is often used in machine learning to generate feature vectors from textual features by applying a hash function to the features. The generated feature vectors can then be used to train a classifier.

In some implementations, the training documents and the number of features are numerous enough that feature extraction is performed in a distributed processing environment. For example, MapReduce can be used to perform feature extraction of the training documents in a parallel and distributed manner. MapReduce is described, for example, by Dean and Ghemawat in "MapReduce: Simplified Data Processing on Large Clusters," OSDI'04: Sixth Symposium on Operating System Design and Implementation, San Francisco, Calif., December, 2004, which is incorporated by reference. Other suitable distributed processing techniques can alternatively be used.

Features that can be selectively extracted from the content of the training documents include the following:

Token n-Grams:

Token n-grams are sequences of adjacent tokens in a document. A token can be, for example, individual words or other textual features in the document. An n-gram is a sequence of tokens having length 'n'. For example, a 3-gram is a sequence of three tokens, e.g., "the red fox." The extracted token n-grams can include a specified number based on frequency of occurrence, for example, the 150 most common 2-grams, 3-grams, and 4-grams in the training documents.

Parse n-Grams:

Parse n-grams are similar to token n-grams, but derived from traversing a dependency parse tree and extracting dependency labels. In particular, a dependency parse tree can be generated based on dependency grammar for a given n-gram. The dependency grammar indicated a dependency relationship between terms of the n-gram, e.g., how words are related to each other and typically using a verb as a structural center. The dependency tree can use a verb as a root and the other words as nodes of the tree based on this dependency relationship.

For example, in the 4-gram sentence "the furry dog barked", "the" is a determiner of "dog", "furry" is an adjectival modifier of "dog", "dog" is the nominal subject of barked, and "barked" is the sentence root. Starting at "the", the system extracts the parse n-gram: "det>nsubj>ROOT". Note that in the dependency tree, "furry" isn't on the parse page of "the" instead "the" attaches directly to "dog." The parse n-gram feature can provide an insight into common sentence structures in the document. The extracted parse n-grams can include a specified number based on frequency of occurrence, for example, the 150 most common parse n-grams of length n=3 and 4.

Part of Speech [Partofspeech] n-Grams:

The part of speech n-gram is similar to the token n-grams, but instead of extracting the word from the token, the system uses the part of speech. For example, the part of speech n-gram for the sentence "the furry dog barked" would be "DT JJ NN VBD" where "DT" indicates a determiner, "JJ" indicates an adjective, "NN" indicates a noun, and "VBD" indicates a verb (past tense). This feature is also intended to capture aspects of common sentence structures in the document. The extracted part of speech n-grams can include a specified number based on frequency of occurrence, for example the 50 most common part of speech n-grams of length n=2 and 3.

Linear Parse n-Grams:

The linear parse n-gram features are similar to the part of speech n-gram features, except instead of extracting the part of speech of each token, the system extracts its parse tag. For the example sentence "the furry dog barked", the system would extract "det amod nsubj ROOT". The linear parse n-grams can include a specified number based on frequency of occurrence, for example use the 150 most common linear parse n-grams of length n=3 and 4.

The linear parse n-gram describes the grammatical function that each word plays in a sentence. For example, a noun can be a nominal subject of a verb or it can be a direct object of a verb. Similarly, a verb can be a root of a sentence, or it can be the head of a relative clause that modifies a noun, e.g., "wore" in "the man who wore a hat." By comparison, the parts of speech n-gram, above, describes what kind of word it is, e.g., the word is a noun or a verb.

Sentence Length:

The sentence length feature refers to the average sentence length for a given document. The length of each sentence, e.g., number of tokens for each sentence, can be determined and then the average length calculated. For each document, the average sentence length is associated with buckets having a range of width 3. Thus, for example, a particular document with an average sentence length of 10 tokens would get the feature "average sentence length: 9-11."

Pronoun Person Frequency:

The pronoun person frequency feature refers to the relative frequency of first, second, and third person pronouns among all pronouns in a given document. For each document, the system assigns the pronoun frequency counts to a bucket for each pronoun type and having a specified range, e.g., the system can have a document feature indicating that first person pronouns make up 5-10% of all pronouns in the document.

In some implementations, preposition frequencies from the training documents are extracted using a tool that identifies all the phrases in the document that refer to entities in the world, e.g., a mention chunker or a noun phrase chunker.

For example, in the sentence below, the underlined phrases could be considered entity phrases:

Michelle Obama walked her dog Bo on the lawn of the White House on Sunday. She enjoyed the walk.

The process then determines which of these underlined phrases are pronouns (in this case, "her" and "she"). In some implementations, the features correspond to the percentage of all mention chunks that are pronouns. In some other implementations, it is determined whether the pronouns are first-person, second-person, or third-person. The percentage of pronouns that are first, second, or third person, are used as features. Alternatively, in some other implementations, a mention chunker is not used to extract the pronoun person frequencies. Instead a list of pronouns are created for a particular language. The text of the document is then compared to the list of pronouns.

Punctuation Frequency:

The punctuation frequency feature refers to the relative frequency of different punctuation types in a given document, bucketed into specified ranges. An example feature could indicate that periods make up 60-65% of all punctuation marks in a particular document. This feature is intended to capture differences in punctuation styles in different genres, e.g., lots of exclamation points in blogs and comments, lots of periods and semicolons in news, etc.

In some implementations, other types of features can be extracted. In particular, features that relate to a variety and distribution of entities in documents can be extracted. These features are intended to capture aspects of the narrative structure of the documents. For example, if an entity occurs consistently throughout a particular document, resulting in a large coreference cluster that spans the entire document, the document may be a longform document about the entity. In another example, a distribution in which each paragraph introduces a new entity may be more characteristic of a more general document about multiple entities, e.g., a document providing a summary of stock performances.

The extracted features from each document in the received training documents form a collection of feature instances 110. These extracted features are used by the classifier training engine 112 to train a model for a longform document classifier. Not all features need be provided to the classifier training engine 112. Instead, different combinations of features can be used depending on the particular classifier application.

Any suitable document classifier can be trained and used to classify longform documents. In some implementations, the longform document classifier is trained using an existing classifier in which the features are input. In some other implementations, a specific longform document classifier is constructed. In some implementations, the longform document classifier is generated using a maximum entropy classifier.

Training the longform document classifier 106 by the classifier training engine 112 is a machine learning process that learns respective weights to apply to each input feature. Typically, a document classifier is trained using an interactive process that assigns weights to each of the input features. Briefly, based on initial weights assigned to each feature, the iterative process attempts to find optimal weights. In a maximum entropy classifier, this is performed by identifying feature weights that maximize the likelihood that a document will be correctly classified as being longform or not. The optimum feature weights result in a predicted expectation for the feature that matches its empirical expectation and that satisfy an entropy condition. Further information on maximum entropy classifiers can be found in Berger et al. "A Maximum Entropy Approach to Natural Language Processing," Association for Computational Linguistics, 1989, which is incorporated by reference. Additionally, other suitable classifiers can be used including naïve Bayes, decisions trees, or support vector machine based classifiers.

Based on the learned feature weights, an input document can be scored by the generated longform document classifier 106. In some implementations, each input document is scored by the longform document classifier 106 as a probability of being a longform document on a scale from 0.0-1.0. In some implementations, the output classifier score for each document is compared to a threshold probability value to determine whether to classify the document as longform or not.

In some implementations, after training, the longform document classifier can be evaluated using an obtained group of sample documents having known classifications, and that are distinct from the training documents, e.g., training documents 102 of FIG. 1. Similarly to the training documents 102, the group of sample documents include both positive document and negative documents. The sample documents can be annotated with the corresponding classification of the document as longform or not longform.

The documents of the group of sample documents are each scored by the longform document classifier. As noted above, the score indicates a likelihood that the document is a longform document. The scores are compared to the annotations to evaluate the accuracy of the longform document classifier. If the output classifications of the longform documents do not substantially match the annotations, the classifier can be adjusted or trained on a new set of training documents.

Figure 2:
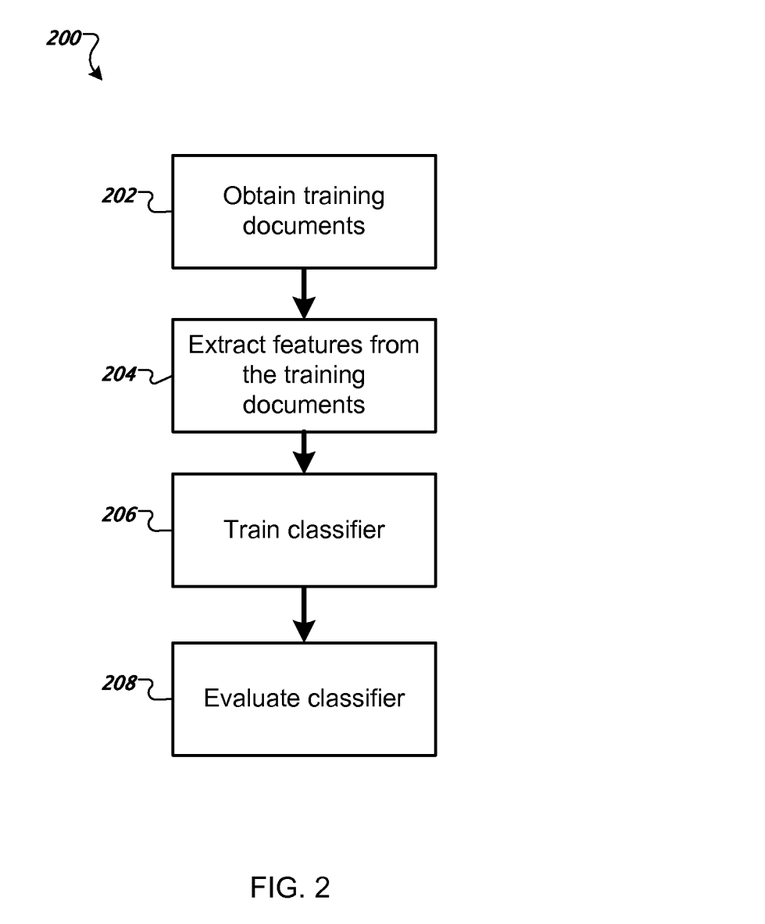
FIG. 2 is a flowchart of an example process for training a longform document classifier.

FIG. 2 is a flowchart of an example process 200 for training a longform document classifier. For convenience, the process 200 will be described as being performed by a system of one or more computers, located in one or more locations, and programmed appropriately in accordance with this specification. For example, a classifier generator, e.g., the classifier generator 104 of FIG. 1, appropriately programmed, can perform the process 200.

The system obtains a collection of training documents (202). The collection of training documents can be assembled by the system or obtained from another source. The training documents, e.g., training documents 102, include positive examples of longform documents and negative examples that are not longform documents.

The system extracts features from the training documents (204). As described above with respect to FIG. 1, a feature extractor, e.g., feature extractor engine 108, can extract one or more features from each document. The features represent lexical and textual features of the document content. Different combinations of features can be extracted depending on the nature of the particular document classifier being generated.

The system uses the extracted feature instances to train a longform document classifier having the extracted features as variables (206). The training of the longform classifier assigns optimum weights to the respective features that maximize the likelihood of correctly classifying an input document as being a longform document.

The system evaluates the longform document classifier (208). In particular, the longform document classifier is applied to a group of known sample documents. The output classification of the longform document classifier is compared to the known classification of the documents. As a result, the validity of the longform document classifier can be validated. The longform document classifier can then be applied to a larger corpus of documents, e.g., a web corpus, and the output classifications can be included in a document index used for information retrieval, e.g., by a search system.

Figure 3:
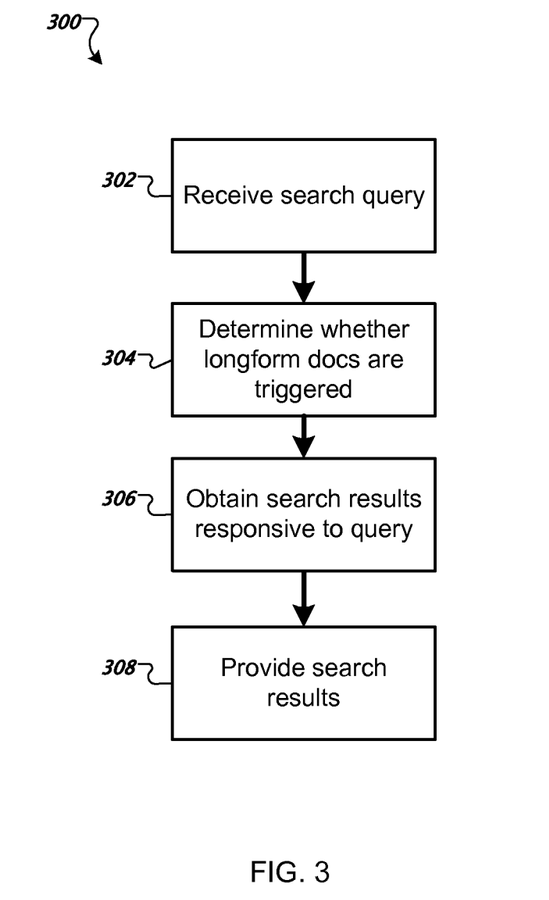
FIG. 3 is a flowchart of an example process for providing longform search results.

FIG. 3 is a flowchart of an example process for providing longform search results. For convenience, the process 200 will be described as being performed by a system of one or more computers. For example, the system can be a search system configured to provide search results in response to a received search query.

A search query is received (302). For example, the search system receives a query from a user device. For example, a user can input a search query to a search interface provided by the search system.

The search system determines whether longform search results are triggered (304). In response to determining that longform search results are not triggered, general search results responsive to the received search query are obtained (306). In response to determining that longform search results are triggered, the system obtains one or more longform search results responsive to the query (306).

One or more criteria can be used to determine whether a particular search query triggers longform search results. In some implementations, one or more terms in the search query can correspond to determine whether longform search results are triggered. For example, the one or more terms can be indicative of a particular topic for which longform search results are often sought by users. In some other implementations, general search results for the search query are obtained and analyzed to determine whether longform results are triggered. For example, one or more URLs identified by the general search results are compared to a list of sources indicative of an in-depth search. If one or more matching URL's are identified, the system determines that longform search results are to be represented in search results. In some implementations, documents that have been classified as longform documents, e.g., using the classifier described above, are indicated in an index. Search results responsive to the query that are longform documents can be determined by the search system using the index.

The system provides search results (308). If it was determined not to include longform search results, the provided search results include general search results. The general search results are provided for display, e.g., in a search results interface of a user device. If it was determined to include longform search results, the provided search results include general search results and one or more longform search results, e.g., in the search results interface of the user device. The longform search results can be displayed in a separate region of the search results interface distinct from the general search results.

In some alternative implementations, the received search query is specifically provided with an indication that longform search results are to be provided. For example, a particular filter can be selected in the search interface indicating the user is seeking longform results. In another example, a specific search interface for longform document searching is provided that is distinct from a general search interface. In such cases, the provided search results can be limited to only longform search results without general search results.

Figure 4:
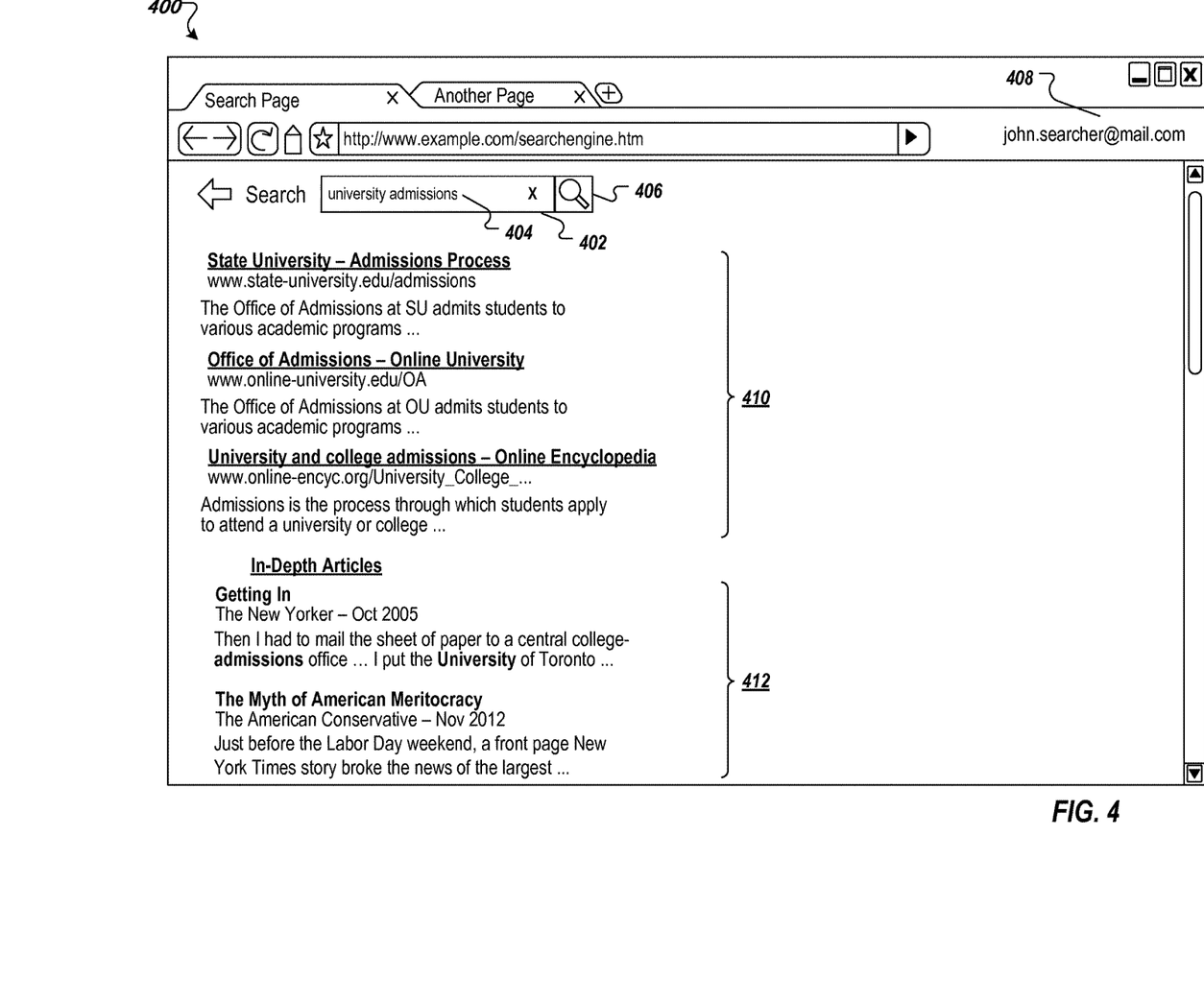
FIG. 4 is an example search results page including results for longform documents.

FIG. 4 is an example search results page 400 including results for longform documents. Although the example search results page 400 is depicted inside a web browser of a user device, this is for context only and is not intended to limit the scope of the present disclosure to any one web browser or even to implementations involving serving a web page. The illustrated search results page 400 includes a search box 402, a search query 404, a search button 406, user information 408, general search results 410, and longform document search results 412.

In the depicted example, the search query 404 is provided as [university admissions]. In response to the query 406, the general search results 410 are displayed in a first region of the user interface and the longform documents search results 412 are displayed in a second, distinct, region of the user interface as indicated by an "In-Depth Articles" heading. In some implementations, the interface includes a link to addition longform documents search results. The general search results 410 represent content that would not be described as in-depth articles with respect to university admissions, and include web pages of one or more universities describing respective admissions processes, and a web page published on an encyclopedic web site that generally describes university admissions processes. The longform documents search results 412 represent content that would be described as in-depth documents with respect to university admissions, provide insightful perspective on university admissions, and provoke deeper thought in some readers.

An electronic document, which for brevity will simply be referred to as a document, may, but need not, correspond to a file. A document may be stored in a portion of a file that holds other documents, in a single file dedicated to the document in question, or in multiple coordinated files.

In this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   obtaining a collection of training documents, the training documents including a group of positive documents and a group of negative documents, wherein the positive documents are training documents identified as being longform documents and the negative documents are training documents identified as not being longform documents;
   extracting a plurality of features from the training documents, wherein the plurality of features are associated with a plurality of different feature types that represent lexical or textual content of the training documents that are indicative of a document's writing style;
   generating a longform document classifier trained using feature instances extracted from the training documents, wherein the generated longform document classifier is trained such that input documents are classified as being longform documents or classified as not being longform documents;
   applying the longform document classifier to a corpus of documents;
   annotating an information retrieval index with an output classification for each document of the corpus of documents; and
   using the annotated index to provide search results identifying longform documents in response to a search query.

2. The method of claim 1, further comprising evaluating the generated longform document classifier using a group of sample documents having known classifications.

3. The method of claim 1, wherein the one or more features include a parse n-gram feature that indicates common sentence structures in the documents based on dependency parse trees.

4. The method of claim 1, wherein the one or more features include a parts of speech n-gram feature that indicates aspects of common sentence structures in the documents.

5. The method of claim 1, wherein the one or more features include a linear parse n-gram feature that extracts parse tags for a sequence of tokens.

6. The method of claim 1, wherein the one or more features include a pronoun person frequency feature that identifies a relative frequency of first, second, and third person pronouns among all pronouns in a given document.

7. The method of claim 1, wherein the one or more features include a pronoun person frequency feature that identifies a frequency of pronouns in a given document.

8. The method of claim 1, wherein the one or more features include a punctuation frequency that identifies a relative frequency of different punctuation types in a given document.

9. A system comprising:
one or more computers and one or more storage devices storing instructions that are operable, when executed by the one or more computers, to cause the one or more computers to perform operations comprising:
obtaining a collection of training documents, the training documents including a group of positive documents and a group of negative documents, wherein the positive documents are training documents identified as being longform documents and the negative documents are training documents identified as not being longform documents;
extracting a plurality of features from the training documents, wherein the plurality of features are associated with a plurality of different feature types that represent lexical or textual content of the training documents that are indicative of a document's writing style;
generating a longform document classifier trained using feature instances extracted from the training documents, wherein the generated longform document classifier is trained such that input documents are classified as being longform documents or classified as not being longform documents;
applying the longform document classifier to a corpus of documents;
annotating an information retrieval index with an output classification for each document of the corpus of documents; and
using the annotated index to provide search results identifying longform documents in response to a search query.

10. The system of claim 9, further operable to perform operations comprising evaluating the generated longform document classifier using a group of sample documents having known classifications.

11. The system of claim 9, wherein the one or more features include a parse n-gram feature that indicates common sentence structures in the documents based on dependency parse trees.

12. The system of claim 9, wherein the one or more features include a parts of speech n-gram feature that indicates aspects of common sentence structures in the documents.

13. The system of claim 9, wherein the one or more features include a linear parse n-gram feature that extracts parse tags for a sequence of tokens.

14. The system of claim 9, wherein the one or more features include a pronoun person frequency feature that identifies a relative frequency of first, second, and third person pronouns among all pronouns in a given document.

15. The system of claim 9, wherein the one or more features include a pronoun person frequency feature that identifies a frequency of pronouns in a given document.

16. The system of claim 9, wherein the one or more features include a punctuation frequency that identifies a relative frequency of different punctuation types in a given document.

17. One or more non-transitory computer-readable storage media encoded with instructions that, when executed by one or more computers, cause the one or more computers to perform operations comprising:
obtaining a collection of training documents, the training documents including a group of positive documents and a group of negative documents, wherein the positive documents are training documents identified as being longform documents and the negative documents are training documents identified as not being longform documents;
extracting a plurality of features from the training documents, wherein the plurality of features are associated with a plurality of different feature types that represent lexical or textual content of the training documents that are indicative of a document's writing style;
generating a longform document classifier trained using feature instances extracted from the training documents, wherein the generated longform document classifier is trained such that input documents are classified as being longform documents or classified as not being longform documents;
applying the longform document classifier to a corpus of documents;
annotating an information retrieval index with an output classification for each document of the corpus of documents; and
using the annotated index to provide search results identifying longform documents in response to a search query.

18. The one or more non-transitory computer readable media of claim 17, wherein the one or more features include a parse n-gram feature that indicates common sentence structures in the documents based on dependency parse trees.

19. The one or more non-transitory computer readable media of claim 17, wherein the one or more features include a parts of speech n-gram feature that indicates aspects of common sentence structures in the documents.

* * * * *